A. L., G. M. & O. E. PETERS.
Anti-Friction Journal-Box.
No. 197,289. Patented Nov. 20, 1877.
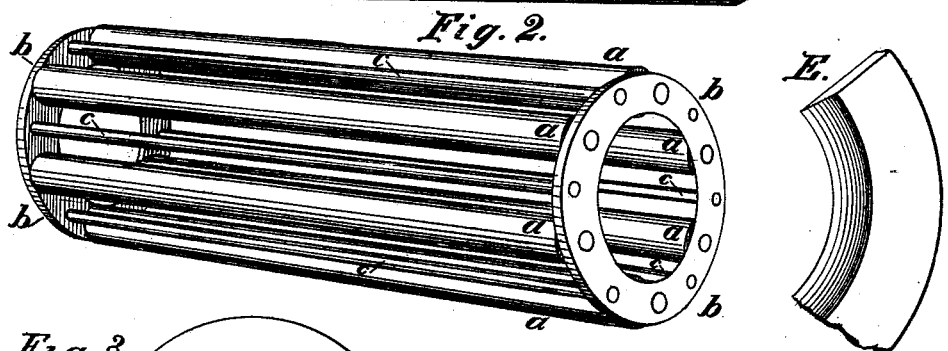
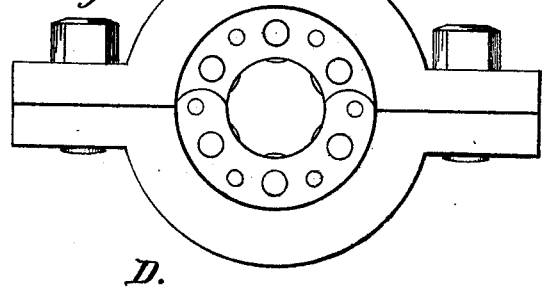
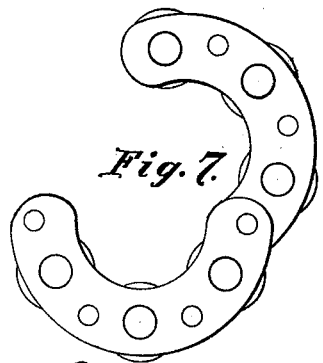
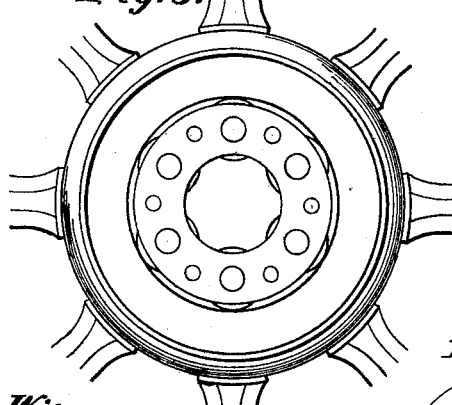
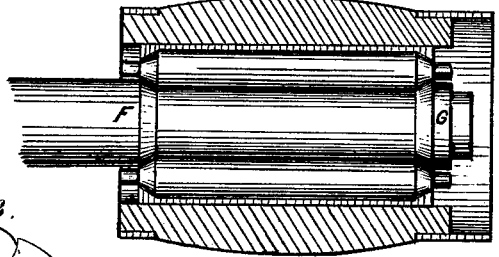
Witnesses
Inventors.

UNITED STATES PATENT OFFICE.

ALVIN L. PETERS, OF ANOKA, MINN., GERSHAM M. PETERS, OF BUFFALO, NEW YORK, AND ORRIN E. PETERS, OF LANCASTER, OHIO.

IMPROVEMENT IN ANTI-FRICTION JOURNAL-BOXES.

Specification forming part of Letters Patent No. 197,289, dated November 20, 1877; application filed November 9, 1877.

*To all whom it may concern:*

Be it known that we, ALVIN L. PETERS, of Anoka, in the county of Anoka and State of Minnesota, GERSHAM M. PETERS, of Buffalo, in the county of Erie and State of New York, and ORRIN E. PETERS, of Lancaster, in the county of Fairfield and State of Ohio, have invented an improvement for overcoming the friction of the bearing of all vehicles mounted on wheels, and the journals of all revolving shafts, cylinders, and bearings of machinery, of which the following is a specification:

The invention is a combination of rollers or cylinders, made of iron, steel, or any suitable metal or other material, of sufficient number and suitable in length, size, and form, which revolve around the spindle or bearing of the axle within the hub of the wheel, and around the journal or bearing of the shaft or cylinder, and within the journal-box, the rollers being independent of the bearing and the hub or journal-box.

These rollers may be of uniform thickness throughout their length, or a part of the same made smaller in such places as may be desired, to release them from supporting the bearing. To support and keep the rollers from running against one another, and thereby producing friction, both ends of each are made with a bearing, which goes into rings, or their equivalents, in such a manner as to allow the rollers to turn freely on their bearings as they revolve around the bearing of the axle or shaft. These rings may be flat, or one or both sides rounding or oval, and of one entire piece, or made in sections or parts, and the parts fitted or hinged together in such a manner as to form the required ring.

The rings are fastened together in a secure and firm manner, with a sufficient number of rods or bars passing from side to side between the spaces for the rollers, with room enough between the rings to allow the rollers to turn freely on their axes.

The above-described rings are made less in width than the diameter or thickness of the rollers, that the bearing may not rest on the inner edge of the rings, and, if the rings are made to work entirely within the hub or journal-box, that its outer edge may not touch the hub or journal-box; or, if it is desirable to make the roller so long as to bring one or both rings without the hub or box, the outer part of the rings may be made wide enough to project beyond the rollers, and thus serve the purpose of a shoulder or flange to keep the combination of rollers in their place within the hub or journal-box; or the outer part of the ring may be less in width than the rollers, and the ends of the rollers made to bevel or taper to the rings. Then a corresponding beveled flange, or its equivalent, may be fitted to the hub or box for the beveled shoulders of the rollers to work against. Said bevels may be made smooth, cogged, or notched, for the same purpose; or a ring or flange, or its equivalent, having both sides flat, or one or both sides rounding or oval, may be fastened to one or both sides of the hub or journal-box for the purpose; or there may be sections or segments simply of such described round, oval, flat, or beveled rings or flanges, or equivalents, attached to the hub or box, so as to extend in and by the end of the rollers at such point or points wherein it would best answer the purpose, or simply a bar, flat, round, or oval, or its equivalent, so attached; or one or more segments of a circular plate, or its equivalent, may be fastened to the hub or box, so as to project in and by the outer portions of the ends of the rollers at a point or points where it would best serve the purpose of keeping the rollers in place.

To retain the wheel on the bearing of the axle, as the wheel of a common road-vehicle, the ordinary nut in use for that purpose, or its equivalent, is made to bevel in conformity with the beveled ends of the rollers, and the bearing or axle at the inner ends of the rollers is made with a beveled shoulder to correspond with the ends of rollers.

Referring to the accompanying drawings, Figure 1 represents a roller beveled at the ends, as described.

In the combination of rollers, Fig. 2, *a a a a a a* represent the rollers; *b b*, the rings; *c c c*, the rods or bars holding the combination of rings and rollers together.

Fig. 3 shows a journal-box and journal, with the combination of rollers, as represented by Fig. 2, inclosed within the box. D shows a section or segment of a beveled flange for holding rollers in place, and E a section or segment of circular plate for same purpose.

Fig. 4 shows a bearing, with the beveled shoulder F and beveled nut G, for the purpose specified.

Fig. 5 shows the wheel of a common road-vehicle, with the combination of rollers, as shown by Fig. 1, in the hub, as retained on the bearing by the beveled shoulder and nut shown in Fig. 4.

Fig. 6 shows a roller not of uniform thickness.

Fig. 7 shows the ring made in parts and fitted or hinged together.

Fig. 8 is a modification of the form of rings and bearings for rollers, in which 1 represents the grooves on the circumference of the ring for pivots of rollers, 2 designates the bolt-heads of fastening-rods, and 3 represents the opening for the journal.

We claim—

1. The several devices, as described, for holding the series of rollers in the hub or journal-box—viz., the flanged or shouldered box, nut, or journal, or their equivalent—to conform with the bevels of the rollers, the rings either as an entire circular piece or sections thereof, either flat or one or both sides round or oval, and the connecting-bars all revolving simultaneously together.

2. The bearings with the shoulder beveled or notched, combined with the nut, or its equivalent, correspondingly beveled or notched, as shown in Fig. 4.

3. The several parts, as described, combined for the purpose of overcoming the friction on the bearings of revolving wheels, shafts, and cylinders.

4. A cylinder or frame made of notched plates or flanges fastened together by rods or bolts, (see Fig. 8,) which, when in position in the hub or boxing, retains the rollers in their respective places, revolving simultaneously with them.

ALVIN L. PETERS.
G. M. PETERS.
O. E. PETERS.

Witnesses:
R. E. STOWER,
J. G. HOUSTON.

Witnesses to signature of G. M. Peters:
W. T. WARREN,
JOHN M. PROVOOST.

Witnesses to signature of O. E. Peters:
W. W. OBAUGH,
W. E. CLESS.